US008757365B2

(12) United States Patent
Nakano

(10) Patent No.: US 8,757,365 B2
(45) Date of Patent: Jun. 24, 2014

(54) IMAGE FORMING APPARATUS

(75) Inventor: Hiroshi Nakano, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 13/603,991

(22) Filed: Sep. 5, 2012

(65) Prior Publication Data

US 2013/0062166 A1  Mar. 14, 2013

(30) Foreign Application Priority Data

Sep. 9, 2011 (JP) ................................. 2011-197399

(51) Int. Cl.
B65G 23/44 (2006.01)

(52) U.S. Cl.
CPC ...................................... B65G 23/44 (2013.01)
USPC ........................................................ 198/814

(58) Field of Classification Search
USPC ........................... 198/814, 816; 399/302, 303
See application file for complete search history.

(56) References Cited

U.S. PATENT DOCUMENTS

| 4,369,617 | A | * | 1/1983 | Hanaway et al. ............. 198/814 |
| 5,481,338 | A |   | 1/1996 | Todome |
| 5,619,310 | A |   | 4/1997 | Todome |
| 5,896,979 | A | * | 4/1999 | Hokari et al. ................. 198/807 |
| 6,505,026 | B2 |   | 1/2003 | Hayakawa et al. |
| 7,565,095 | B2 | * | 7/2009 | Mori ............................. 399/165 |
| 2002/0021920 | A1 |   | 2/2002 | Hayakawa et al. |
| 2002/0046932 | A1 | * | 4/2002 | Wakana ........................ 198/840 |

FOREIGN PATENT DOCUMENTS

| JP | 01-214547 A | 8/1989 |
| JP | 05-018450 | 1/1993 |
| JP | 05-232776 A | 9/1993 |
| JP | 06-278894 A | 10/1994 |
| JP | 08-076554 A | 3/1996 |
| JP | 2002-060085 A | 2/2002 |
| JP | 2003-255642 A | 9/2003 |
| JP | 2003-255718 A | 9/2003 |
| JP | 2004-077866 A | 3/2004 |

* cited by examiner

Primary Examiner — James R Bidwell
(74) Attorney, Agent, or Firm — Banner & Witcoff, Ltd.

(57) ABSTRACT

An image forming apparatus includes urging members provided at first and second ends in an axial direction of at least one of a plurality of rollers around which an endless belt is wound, so as to urge the at least one roller and apply a tension to the endless belt. The urging members include a first urging member for applying a first moment about a middle point of a contact portion of a predetermined one the rollers in the axial direction and a second urging member for applying a second moment about the middle point. The second moment is different from the first moment such that a first-side portion, where a guide is provided to fit into a groove formed on at least one roller, of the endless belt with respect to the middle point is extended by a same length as a second-side portion of the endless belt.

9 Claims, 7 Drawing Sheets

|  | Thickness [mm] | 0.12 |
|---|---|---|
| Endless Belt | Width (Half Width) [mm] | 120 |
|  | Sectional Area [mm²] | 14.4 |
|  | Thickness [mm] | 1.5 |
| Guide | Width [mm] | 4 |
|  | Sectional Area [mm²] | 6 |
|  | Thickness [mm] | 0.05 |
| Reinforcing Tape | Width [mm] | 5 |
|  | Sectional Area [mm²] | 0.25 |

FIG. 4

|  | Young's Modulus [kgf/mm²] | Endless Belt 0.1 % Extension Load [kgf] | Guide 0.1 % Extension Load [kgf] | Reinforcing Tape 0.1 % Extension Load [kgf] |
|---|---|---|---|---|
| PET | 800 | 11.52 |  | 0.200 |
| Polyimide | 500 | 7.20 |  |  |
| PC | 260 | 3.74 |  |  |
| Nylon | 180 | 2.59 |  |  |
| Nylon | 120 | 1.73 |  |  |
| Rubber | 10 |  | 0.060 |  |
| Urethane | 7 |  | 0.042 |  |

FIG. 5

Right Portion of Endress Belt w/o Guide

|  | Young's Modulus [kgf/mm$^2$] | 0.1% Extension Load [kgf] |
|---|---|---|
| Endless belt of Nylon | 120 | 1.73 |

Left Portion of Endress Belt w/ Guide

|  | Young's Modulus [kgf/mm$^2$] | 0.1% Extension Load [kgf] | Ratio to Right Portion of Endless Belt w/o Guide [%] |
|---|---|---|---|
| Endless belt of Nylon | 120 | 1.73 |  |
| Guide of Rubber | 10 | 0.06 |  |
| Reinforcing Tape of PET | 800 | 0.20 |  |
| Total |  | 1.99 | 115 |

Left Portion of Endress Belt w/ Guide

|  | Young's Modulus [kgf/mm$^2$] | 0.1% Extension Load [kgf] | Ratio to Right Portion of Endless Belt w/o Guide [%] |
|---|---|---|---|
| Endless belt of Nylon | 120 | 1.73 |  |
| Guide of Rubber | 10 | 0.06 |  |
| Total |  | 1.79 | 103 |

FIG. 6

| Time [h] | | 0 | 25 | 50 | 100 | 200 | 500 |
|---|---|---|---|---|---|---|---|
| Change Rate of Creep Deformation [%] | Left Portion of Endless Belt w/ Guide | 0 | 1.6 | 2 | 2.5 | 2.8 | 3 |
| | Right Portion of Endless Belt w/o Guide | 0 | 1.84 | 2.3 | 2.88 | 3.22 | 3.45 |

IMAGE FORMING APPARATUS

CROSS-REFERENCE TO RELATED APPLICATION

This application claims priority under 35 U.S.C. §119 from Japanese Patent Application No. 2011-197399 filed on Sep. 9, 2011. The entire subject matter of the application is incorporated herein by reference.

BACKGROUND

1. Technical Field

The following description relates to one or more techniques for an image forming apparatus configured to form an image of recording agent on a recording medium, in particular, for an image forming apparatus having an endless belt configured to convey one of the recording medium and the recording agent.

2. Related Art

Various kinds of image forming apparatuses have been proposed each of which includes an endless belt that is wound around a plurality of rollers having respective axes parallel to each other and configured to be driven to turn and convey a recording medium or recording agent. For example, an image forming apparatus has been known that includes an endless belt as an intermediate transfer belt. Specifically, the endless belt is configured to be driven to turn in contact with a plurality of photoconductive drums carrying respective toner images of respective colors, once carry the toner images sequentially transferred thereto from the photoconductive drums, and then transfer the toner images onto a recording medium such as a sheet. In addition, an image forming apparatus has been known that includes an endless belt as a transfer feeding belt. Specifically, the endless belt is configured to be driven to turn in contact with a plurality of photoconductive drums carrying respective toner images of respective colors and sequentially transfers the toner images onto a sheet being conveyed thereon in a superimposed manner when the sheet passes through respective nipping points between the photoconductive drums and the endless belt.

In the known image forming apparatuses, when the endless belt which is wound around the plurality of rollers having respective axes parallel to each other is driven to turn, the endless belt might gradually get close to one end in the axial direction of the rollers or turn in a snaking manner. In order to overcome the problem, such a technique has been proposed that a continuously-protruding strip-shaped guide is provided in a position, closer to one end than to the other end of the endless belt in the axial direction of the rollers, on the inner circumferential surface of the endless belt, and the guide is fitted into a groove formed on each roller. Further, in this case, such another technique has been proposed as to prevent ruffling of the endless belt by applying a greater urging force, for urging at least one of the rollers in such a direction as to provide a tension to the endless belt, to the one end of the at least one roller in the axial direction than to the other end such that the endless belt is urged to get close to the other end.

SUMMARY

Nevertheless, the proposed technique does not provide any suggestion or verification regarding to what degree the urging force applied to the one end of the at least one roller should be larger than that applied to the other end. Too large a difference between the urging forces applied to the one end and the other end of the at least one roller might cause too large a force for pulling the endless belt to the other end, and it might lead to the guide being severely worn or the guide going off the grooves.

Aspects of the present invention are advantageous to provide one or more improved techniques for an image forming apparatus having an endless belt that is wound around a plurality of rollers and configured to convey one of a recording medium and recording agent, the techniques making it possible to apply appropriate urging forces for urging at least one of the rollers in such a direction as to provide a tension to the endless belt.

According to aspects of the present invention, an image forming apparatus configured to form an image of recording agent on a recording medium is provided, the image forming apparatus including a plurality of rollers having respective axes parallel to each other, an endless belt wound around the plurality of rollers, the endless belt being configured to be driven to turn and convey one of the recording sheet and the recording agent, a strip-shaped guide provided to a first-side portion of the endless belt with respect to a middle point of a contact portion of a predetermined one of the plurality of rollers that turns in contact with the endless belt in an axial direction of the plurality of rollers, the guide being configured to continuously protrude from the inner circumferential surface of the endless belt, a groove formed on at least one of the plurality of rollers, the groove being configured to regulate movement of the endless belt in the axial direction in a state where the guide is fitted into the groove, and urging members provided at a first end and a second end in the axial direction of at least one of the plurality of rollers, the urging members being configured to urge the at least one roller in such a tensile direction as to apply a tension to the endless belt, the urging members including a first urging member configured to apply, to the first end of the predetermined one roller, a first moment about the middle point of the contact portion of the predetermined one roller in the axial direction, and a second urging member configured to apply, to the second end of the predetermined one roller, a second moment about the middle point of the contact portion of the predetermined one roller in the axial direction, the second moment being adapted to be different from the first moment such that the first-side portion of the endless belt with respect to the middle point in the axial direction is extended in the tensile direction by a same length as a second-side portion of the endless belt with respect to the middle point in the axial direction under predetermined conditions of use for the image forming apparatus.

BRIEF DESCRIPTION OF THE ACCOMPANYING DRAWINGS

FIG. 1 schematically shows an internal configuration of an image forming apparatus in an embodiment according to one or more aspects of the present invention.

FIG. 4 is a table showing respective cross-sectional shapes of the endless belt, a guide, and a reinforcing tape for the image forming apparatus in the embodiment according to one or more aspects of the present invention.

FIG. 5 is a table showing a Young's modulus and a 0.1% extension load at room temperature of each material usable for the endless belt, the guide, or the reinforcing tape in the embodiment according to one or more aspects of the present invention.

FIG. 6 is a table showing comparison results of the 0.1% extension loads at room temperature between a right portion of the endless belt where the guide is not provided and a left portion of the endless belt where the guide is provided in the embodiment according to one or more aspects of the present invention.

Figures 7A, 7B:
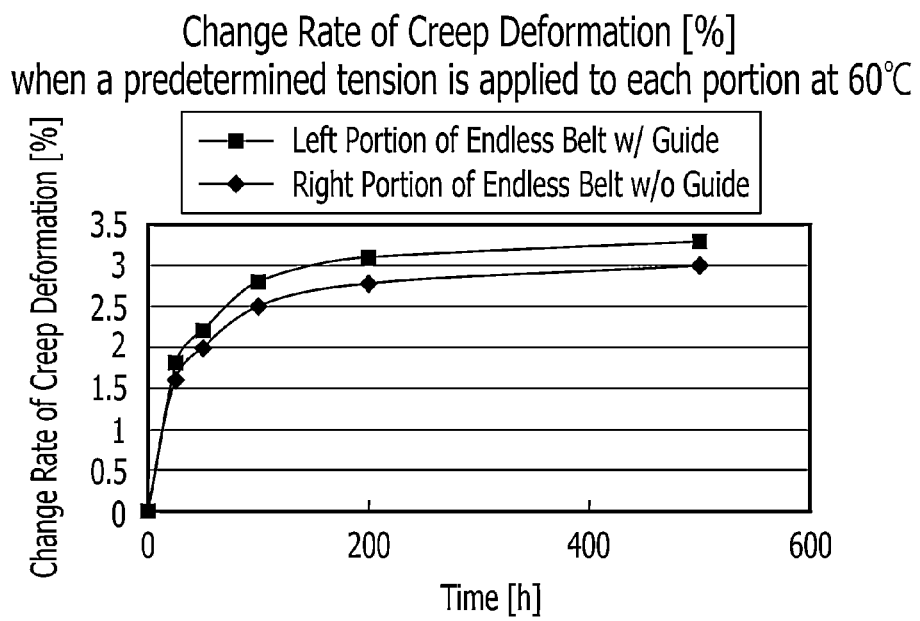

FIGS. 7A and 7B are a table and a graph, respectively, showing comparison results of creep deformation between the left portion of the endless belt where the guide is provided and the right portion of the endless belt where the guide is not provided in a situation where a predetermined load is applied to each of the left and right portions at the environment temperature 60° C. in the embodiment according to one or more aspects of the present invention.

Figure 8:
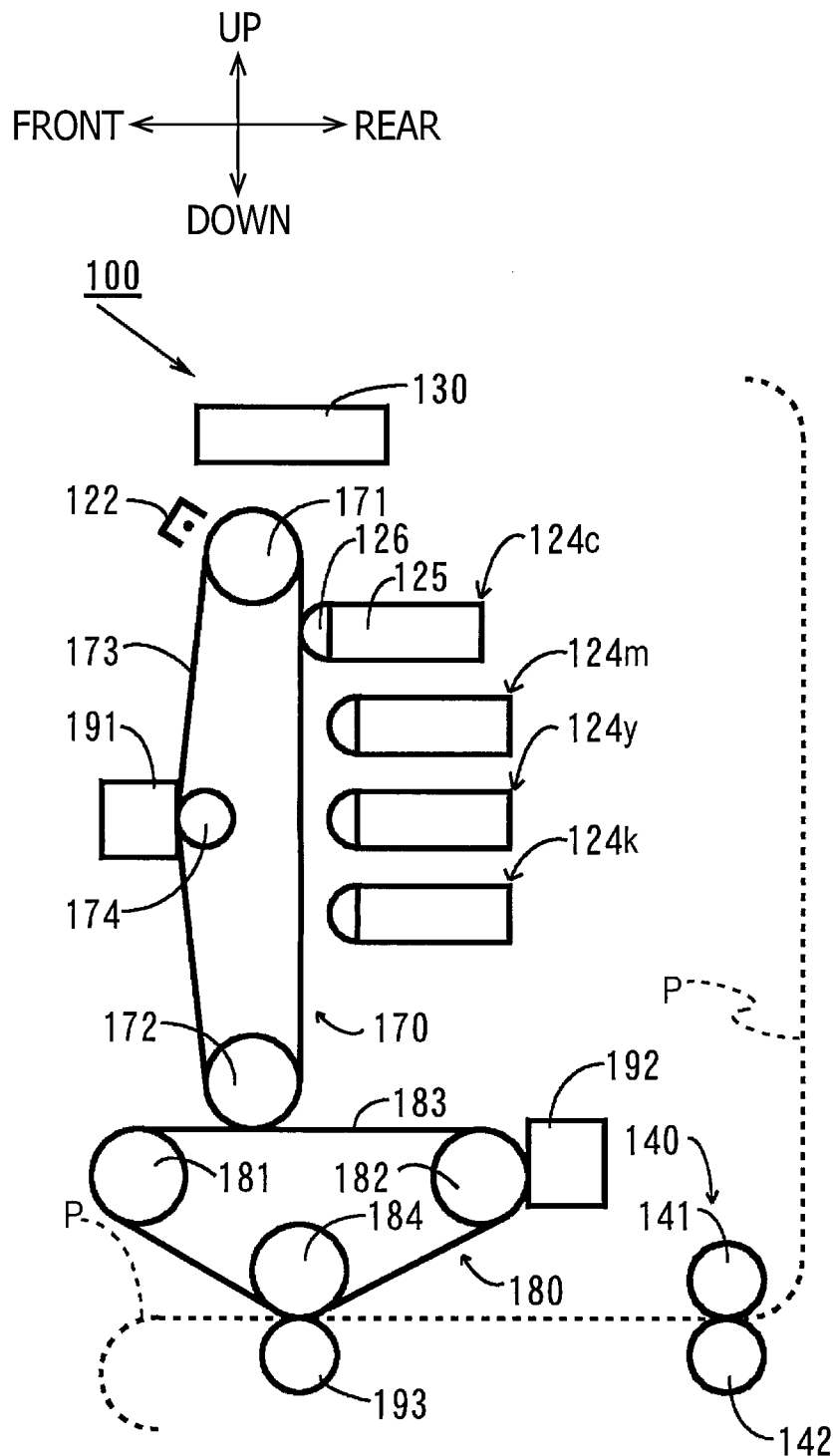

FIG. 8 schematically shows an internal configuration of an image forming apparatus in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

[Overall Configuration of Image Forming Apparatus]

Hereinafter, an image forming apparatus 1 of an embodiment according to aspects of the present invention will be described with reference to the accompanying drawings. It is noted that, in the following description, the front, rear, left, right, upper, and lower sides of the image forming apparatus 1 will be defined as shown in the accompanying drawings.

Figure 1:
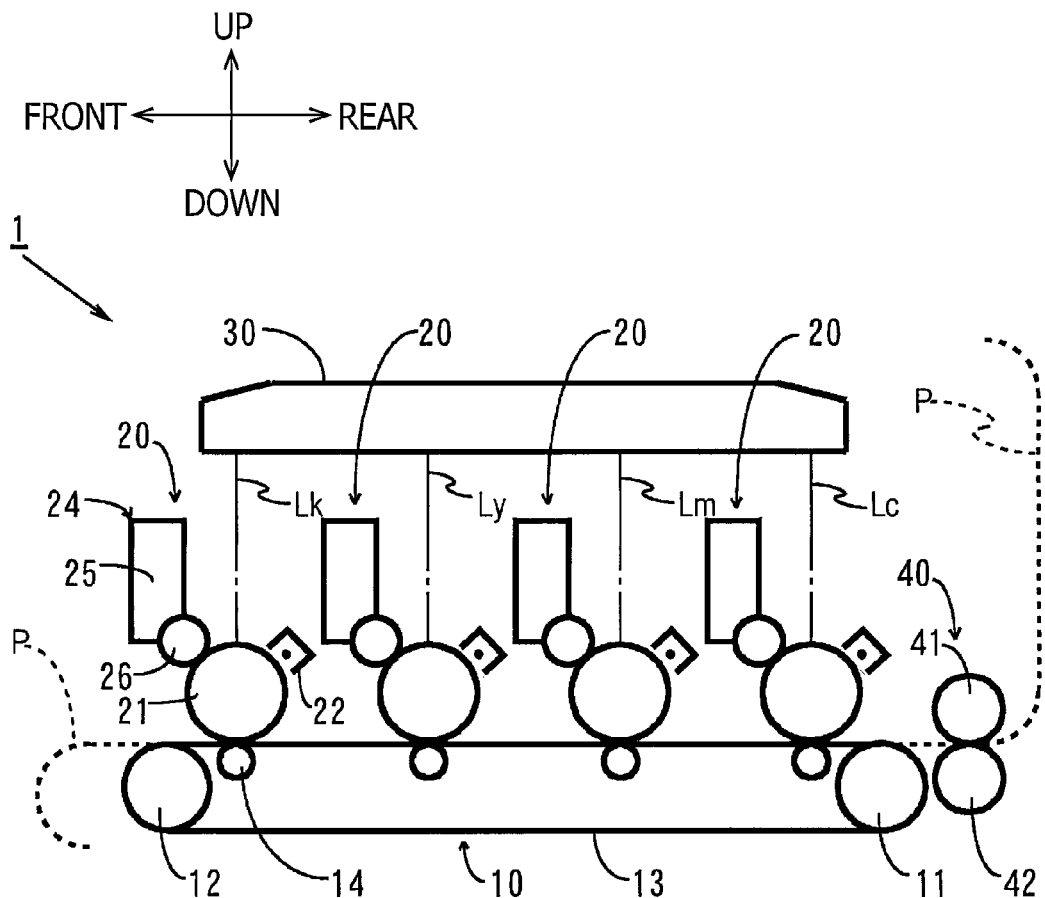

As shown in FIG. 1, the image forming apparatus 1 of the embodiment includes a belt unit 10 and four process units 20 disposed above the belt unit 10. The belt unit 10 includes a driving roller 11, a driven roller 12, and an endless belt 13 wound around the driving roller 11 and the driven roller 12. The four process units 20 are arranged in the front-to-rear direction, respectively, for four colors, i.e., black (K), yellow (Y), magenta (M), and Cyan (C) in an order from the front side of the image forming apparatus 1. The four process units 20 form a direct tandem color image forming unit.

Each process unit 20 includes a photoconductive drum 21, a charger 22, and a development cartridge 24. The photoconductive drum 21 includes a metal dram main body of which a surface layer is covered with a positively chargeable photoconductive layer made of a material such as polycarbonate.

The charger 22 is disposed at an obliquely upper rear side of the photoconductive drum 21 to face the photoconductive drum 21 across such a predetermined distance as to avoid contact with the photoconductive drum 21. The charger 22 is a scorotron charger configured to generate corona discharge from a charge wire made of a material such as tungsten and evenly and positively charge the surface of the photoconductive drum 21. The development cartridge 24 includes therein a toner container 25 that contains positively chargeable non-magnetic one-component toner of one of the four colors. The development cartridge 24 is a known cartridge configured to positively charge the toner in a frictional manner and supply the charged toner to the photoconductive drum 21 via a development roller 26.

Further, the belt unit 10 includes four transfer rollers 14 disposed in such positions as to face the photoconductive drums 21 across the endless belt 13, respectively. The endless belt 13 is driven to rotate in the clockwise direction in FIG. 1 by a clockwise rotation of the driving roller 11. A sheet P is supplied to the surface of the endless belt 13 from a feed tray (not shown) inserted into a lower portion of the image forming apparatus 1, by various rollers (not shown) such as a pickup roller. Then, the sheet P is conveyed to the rear side of the image forming apparatus 1 through respective positions opposed to the photoconductive drums 21.

In addition, there is a scanning unit 30 disposed above the process units 20. The scanning unit 30 includes semiconductor laser devices (not shown) configured to emit laser beams Lk, Ly, Lm, and Lc based on image data of the four colors, respectively, and polygon mirrors (not shown) configured to deflect the laser beams Lk, Ly, Lm, and Lc, respectively. The scanning unit 30 is a known unit configured to scan and expose the photoconductive drums 21 using the laser beams Lk, Ly, Lm, and Lc.

Therefore, when each photoconductive drum 21 is rotated, firstly, the surface thereof is evenly and positively charged by the charger 22. After that, the surface of the photoconductive drum 21 is exposed to the high-speed-scanning laser beam L emitted by the scanning unit 30. Thereby, an electrostatic latent image, which corresponds to an image to be formed on the sheet P, is formed on the surface of the photoconductive drum 21. Subsequently, when the positively-charged toner carried on the development roller 26 becomes opposed to and contacts the photoconductive drum 21 in response to rotation of the development roller 26, the positively-charged toner is supplied to the electrostatic latent image formed on the surface of the photoconductive drum 21. Thereby, the electrostatic latent image on the surface of the photoconductive drum 21 is visualized. Thus, on the surface of the photoconductive drum 21, there is carried a toner image which is formed with the toner adhering on exposed areas of the surface of the photoconductive drum 21.

After that, when the sheet P being conveyed by the endless belt 13 passes through between the photoconductive drum 21 and the transfer roller 14, the toner image carried on the surface of each photoconductive drum 21 is sequentially transferred onto the sheet P by a negative transfer bias applied to the transfer roller 14 under constant electric current control. Next, the sheet P with the toner image transferred thereon is fed to a fuser 40 disposed behind the belt unit 10.

The fuser 40 includes a heating roller 41 that is provided with a heat source such as a halogen lamp and driven to rotate, and a pressing roller 42 that is disposed beneath the heating roller 41 to face the heating roller 41 and configured to press the heating roller 41. The fuser 40 is configured to feed and heat the sheet P with the toner images of the four colors transferred thereon while pinching the sheet P between the heating roller 41 and the pressing roller 42, so as to thermally fix the toner images onto the sheet P. Then, the sheet P with the toner images fixed thereon is ejected by various rollers (not shown) onto a catch tray (not shown) disposed on an upper surface of the image forming apparatus 1.

[Configuration of Belt Unit]

Figure 2:
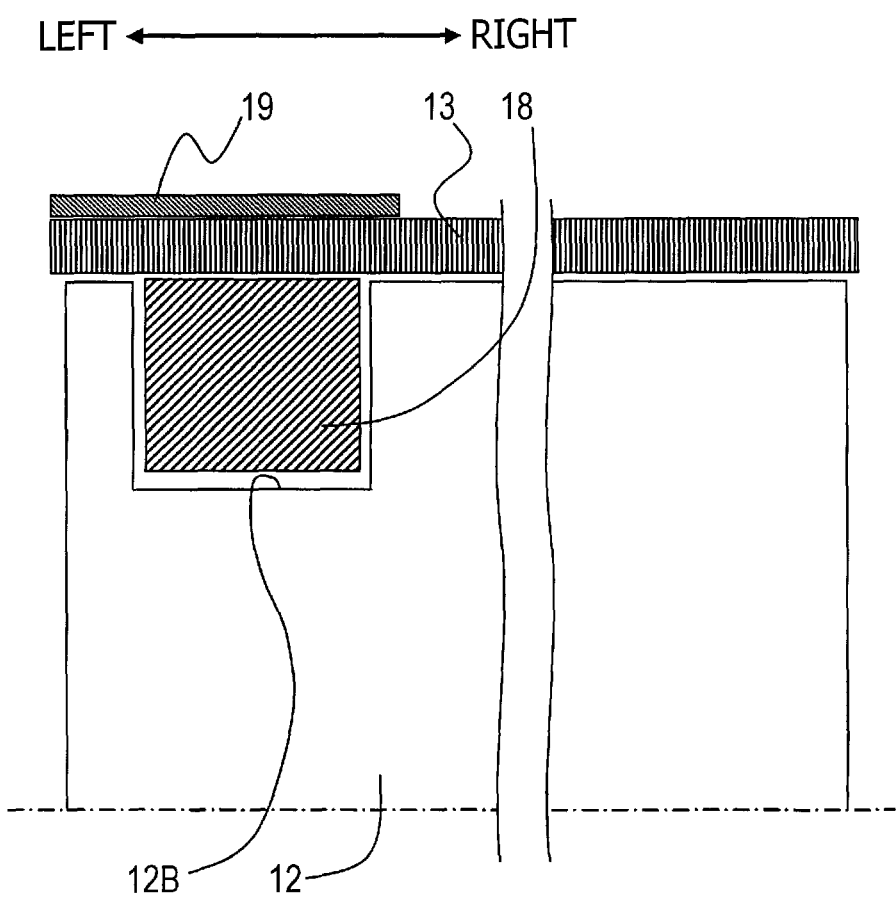
FIG. 2 is a cross-sectional side view schematically showing a partial configuration of an endless belt hung around a driven roller of the image forming apparatus in the embodiment according to one or more aspects of the present invention.

FIG. 2 is a cross-sectional side view schematically showing a part of the endless belt 13 hung around the driven roller 12. As will be described with reference to FIG. 3, rotational shafts 12A of the driven roller 12 are urged forward (in such a direction as to be farther away from the driving roller 11) by springs 17. Thus, the urging force causes an inner circumferential surface of the endless belt 13 to closely contact an outer circumferential surface of the driven roller 12.

As shown in FIG. 2, a strip-shaped guide 18 having a rectangular cross-sectional shape is attached to a left position (closer to a left end than to a right end of the endless belt 13) on the inner circumferential surface of the endless belt 13 using adhesive agent. The guide 18 is configured to continuously protrude from the inner circumferential surface of the endless belt 13. Further, a groove 12B is formed on the outer circumferential surface of the driven roller 12. The groove 12B is configured to, when the guide 18 is fitted thereinto, restrict movement of the endless belt 13 in the left-to-right direction (i.e., an axial direction of the driving roller 11 and the driven roller 12). It is noted that the groove 12B may be formed on the outer circumferential surface of the driven roller 12 or on a roller specially provided for the guide 18 that is supported adjacent to an end face of the driven roller 12 so as to be rotatable relative to the driven roller 12. Further, in addition to the groove 12B formed on the driven roller 12, another groove may be formed on the driving roller 11. The groove 12B may be formed on at least one of rollers (such as the driving roller 11 and the driven roller 12) around which the endless belt 13 is wound. To the left end of the outer circumferential surface of the endless belt 13, a reinforcing tape 19 is attached using adhesive agent. The reinforcing tape 19 has a width enough to cover an area facing the guide 18 across the endless belt 13. The reinforcing tape 19 is configured to prevent an area of the endless belt 13 to which the guide 18 is attached from being damaged and maintain more preferable fitting between the guide 18 and the groove 12B.

Figure 3:
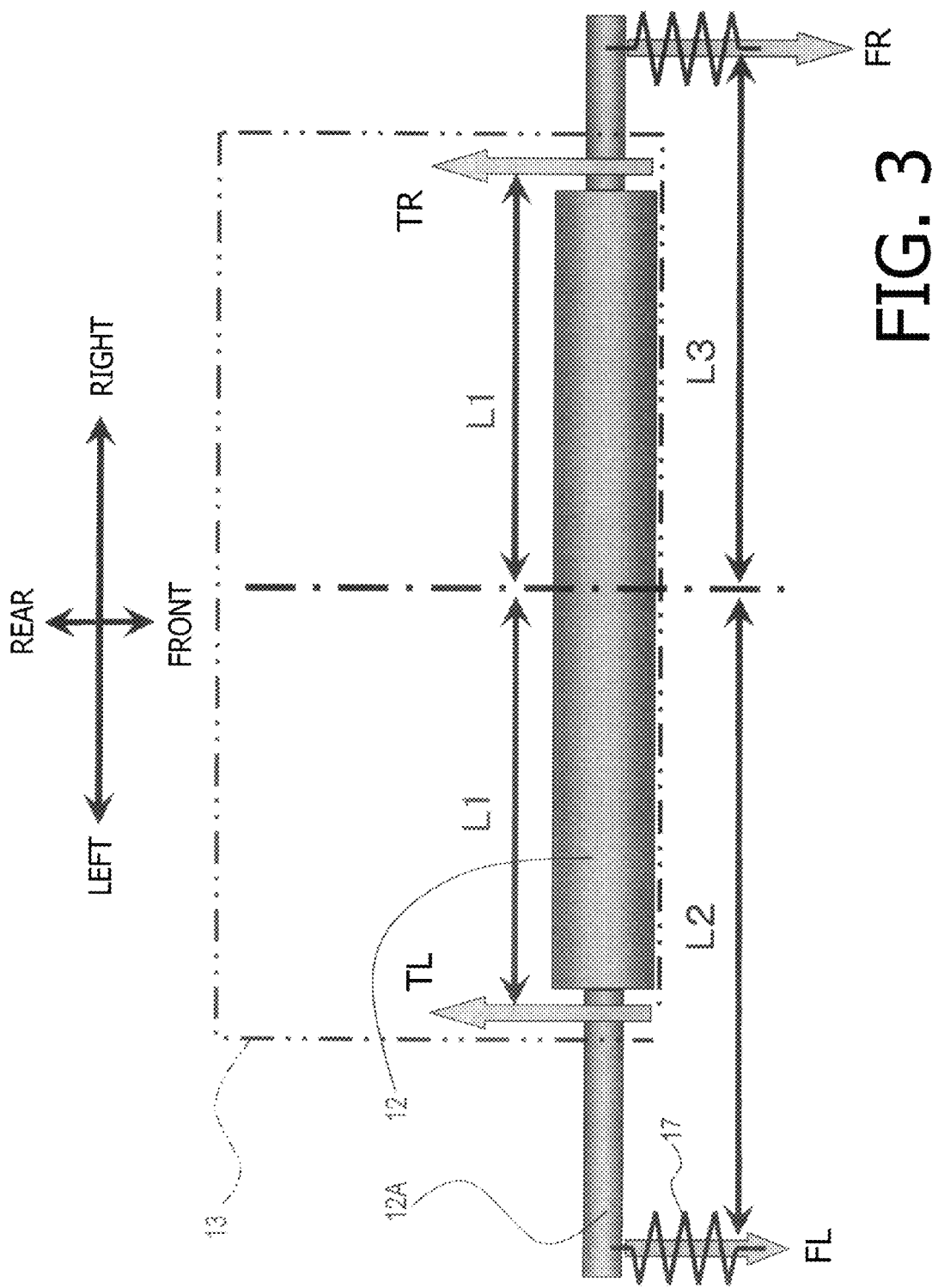
FIG. 3 is a top view showing moments of force about a middle point of the endless belt in the left-to-right direction that are applied to the driven roller in the embodiment according to one or more aspects of the present invention.

As shown in FIG. 3, the two rotational shafts 12A, which protrude from two ends in the axial direction of the driven roller 12 respectively, are connected with the two springs 17, respectively. The two springs 17, which are tension coil springs, are configured to urge the driven roller 12 in such a tensile direction as to apply a tension to the endless belt 13. Each spring 17 is connected with the corresponding rotational shaft 12A via a holder (not shown) so as to urge the driven roller 12 while allowing the rotational shaft 12A to rotate. It is noted that the holder is a known holder and therefore a detailed explanation about it will be omitted.

The two springs 17, which are coil springs complying with the same standard, are configured to apply the same level of urging forces to the respective rotational shafts 12A. The distance between a point of application of one of the urging forces applied to the driven roller 12 and a middle point (indicated by a long dashed short dashed line in FIG. 3) in the left-to-right direction of the endless belt 13 hung around the driven roller 12 is different from the distance between a point of application of the other urging force applied to the driven roller 12 and the middle point. Therefore, the moment of force about the middle point applied by the right spring 17 is different from the moment of force about the middle point applied by the left spring 17. However, in the embodiment, the extension length of a left portion of the endless belt 13 is rendered equal to the extension length of a right portion of the endless belt 13 (i.e., the left portion of the endless belt 13 is extended in the tensile direction by the same length as the right portion of the endless belt 13) in the following method.

Example (1) of Setting of Points of Application of Urging Forces

Next, examples of setting of the point of application of each urging force will be described. First, an explanation will be provided about an example of setting of the point of application of each urging force at room temperature in no consideration of creep deformation. It is noted that the image forming apparatus 1 of the embodiment is designed with cross-sectional shapes of the endless belt 13, the guide 18, and the reinforcing tape 19 as shown in FIG. 4.

Specifically, the cross-sectional area of each of left and right portions of the endless belt 13 with respect to the middle point of the endless belt 13 is 14.4 mm$^2$. The cross-sectional area of the guide 18 is 6 mm$^2$. The cross-sectional area of the reinforcing tape 19 is 0.25 mm$^2$. FIG. 5 shows a Young's modulus at room temperature of each of various materials usable for forming the endless belt 13, the guide 18, or the reinforcing tape 19. In addition, FIG. 5 shows a load (0.1% extension load) required for each of the endless belt 13, the guide 18, and the reinforcing tape 19 to be 0.1% extended. Each 0.1% extension load is determined using the cross-sectional area of the corresponding element and the Young's modulus of the corresponding material. The endless belt 13 is allowed to be made of any material of polyethylene terephthalate (PET), polyimide, polycarbonate (PC), and two kinds of nylon. Thus, FIG. 5 shows the 0.1% extension load for the endless belt 13 made of each material of PET, PC, and the two kinds of nylon. Further, the guide 18 is allowed to be made of any material of rubber and urethane. Thus, FIG. 5 shows the 0.1% extension load for the guide 18 made of each material of rubber and urethane.

Therefore, when the endless belt 13 is made of nylon having a Young's modulus of 120 kgf/mm$^2$ and the guide 18 is made of rubber, the 0.1% extension load for the right portion of the endless belt 13 where the guide 18 is not provided is 1.73 kgf. Meanwhile, the 0.1% extension load for the left portion of the endless belt 13 where the guide 18 is provided is 1.99 kgf, which is equivalent to 115% of the 0.1% extension load for the right portion of the endless belt 13.

Detailed results of the calculation are shown in FIG. 6. It is noted that the reinforcing tape 19 does not necessarily have to be provided. Therefore, FIG. 6 also shows the 0.1% extension load for the left portion of the endless belt 13 where the guide 18 is provided but the reinforcing tape 19 is not provided.

In the example (1), the points of application are set such that a tension TL (see FIG. 3) applied to the left end of the endless belt 13 is equivalent to 115% of a tension TR (see FIG. 3) applied to the right end of the endless belt 13.

Specifically, as shown in FIG. 3, it is supposed that the urging forces applied by the left and right springs 17 are represented by "FL" and "FR" (as described above, the two forces have the same value), respectively. Further, it is supposed that a distance between the middle point and each end in the left-to-right direction of the driven roller 12 (when any end in the left-to-right direction of the endless belt 13 does not protrude outward from the ends in the left-to-right direction of the driven roller 12, a distance between the middle point and each end in the left-to-right direction of the endless belt 13) is represented by "L1." Furthermore, it is supposed that a distance between the middle point and the point of application of the urging force applied by the left spring 17 is represented by "L2." Moreover, it is supposed that a distance between the middle point and the point of application of the urging force applied by the right spring 17 is represented by "L3." In this case, regarding the left side, the following equality holds:

$TL \times L1 = FL \times L2.$

Regarding the right side, the following equality holds:

$TR \times L1 = FR \times L3.$

Thus, in order to set the distances TL and TR to satisfy the relationship "TL:TR=115:100," the distances L2 and L3 have to be set to satisfy the relationship "L2:L3=115:100." It is understood from in FIG. 6 that, when the reinforcing tape 19 is not provided, the distances L2 and L3 have to be set to satisfy the following relationship "L2:L3=103:100."

Thus, by differentiating the moments of force applied by the two springs 17 from each other, the extension length of the left portion of the endless belt 13 is rendered equivalent to that of the right portion under a condition where the endless belt 13 is not creep-deformed at room temperature. Therefore, it is possible to render the extension length of the endless belt 13 even over an entire length in the axial direction of the driven roller 12. Thereby, it is possible to prevent the endless belt 13 from getting close to one end in the axial direction of the driven roller 12 or turning in a snaking manner. Thus, further, it is possible to prevent the endless belt 13 from waving and extend the lifetime of the endless belt 13. In particular, when the guide 18 is attached to the endless belt 13 made of soft material such as nylon, the endless belt 13 is likely to be unevenly extended. However, in the embodiment, it is possible to avoid such an undesired situation in a favorable manner.

It has been known that the tension TL applied to the left portion of the endless belt 13 where the guide 18 is provided is desired to be larger than the tension TR. In the embodiment, since the tensions TL and TR are set based on the aforementioned calculations, it is possible to prevent the tension TL from being excessively enlarged. Thereby, it is possible to prevent the guide 18 from being severely worn and prevent the guide 18 from going off the groove 12B.

Example (2) of Setting of Points of Application of Urging Forces

Subsequently, an explanation will be provided about an example of setting of the point of application of each urging force at the environment temperature 60° C. (which is an upper limit of a predetermined range of usage environment temperatures for the image forming apparatus 1) in no consideration of creep deformation of the endless belt 13. In this situation, the Young's modulus of a thermoplastic one of the aforementioned various materials is smaller than that at room temperature. For instance, at the environment temperature 60° C., the Young's modulus of nylon is 0.75 times as large as that at room temperature (i.e., 120 kgf/mm$^2$). Accordingly, the Young's modulus of the nylon at the environment temperature 60° C. is determined as follows:

$$120 \text{ kgf/mm}^2 \times 0.75 = 90 \text{ kgf/mm}^2.$$

Meanwhile, even at the environment temperature 60° C., the Young's modulus of another material such as PET and rubber is not so different from that at room temperature. Thus, when the aforementioned calculation is carried out again using the Young's modulus of each material at the environment temperature 60° C., the 0.1% extension load for the left portion of the endless belt 13 where the guide 18 is provided is 120% of the 0.1% extension load for the right portion of the endless belt 13 where the guide 18 is not provided. Accordingly, in such a case, by setting the distances L2 and L3 so as to satisfy the relationship "L2:L3=120:100," it is possible to enjoy the aforementioned advantageous effects even at the environment temperature 60° C.

In this case, when the image forming apparatus 1 is used at an environmental temperature less than 60° C., the extension length of the left portion is larger than that of the right portion. Even in such a situation, a force is applied to the endless belt 13 so as to urge the endless belt 13 to get closer to the right side, and thereby it is possible to prevent the endless belt 13 from getting close to one end in the axial direction of the driven roller 12 or turning in a snaking manner.

Example (3) of Setting of Points of Application of Urging Forces

Subsequently, an explanation will be provided about an example of setting of the point of application of each urging force at the environment temperature 60° C. (which is the upper limit of the predetermined range of recommended usage environment temperatures for the image forming apparatus 1) in consideration of creep deformation of the endless belt 13. FIGS. 7A and 7B show values (change rates) of creep deformation [%] in a situation where the endless belt 13 is sectioned with respect to the aforementioned middle point into the left portion where the guide 18 is provided and the right portion where the guide 18 is not provided, and a predetermined load (e.g., 5 kgf) is applied to each portion at the environment temperature 60° C.

As shown in FIGS. 7A and 7B, the creep deformation of the right portion where the guide 18 is not provided is about 15% larger than that of the left portion where the guide 18 is provided. Accordingly, in this case, by setting the distances L2 and L3 so as to satisfy the relationship "L2:L3=115:100," it is possible to enjoy the aforementioned advantageous effects even when the endless belt 13 is creep-deformed at the environment temperature 60° C.

In this case, when the image forming apparatus 1 is used at an environment temperature less than 60° C. or the endless belt 13 is not creep-deformed, the extension length of the left portion of the endless belt 13 may be larger than that of the right portion. Even in such a situation, a force is applied to the endless belt 13 so as to urge the endless belt 13 to get closer to the right side, and thereby it is possible to prevent the endless belt 13 from getting close to one end in the axial direction of the driven roller 12 or turning in a snaking manner.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present invention. It is to be understood that the present invention is capable of use in various other combinations and environments and is capable of changes or modifications within the scope of the inventive concept as expressed herein. For example, the following modifications are possible.

(Modifications)

In the aforementioned embodiment, the point of application where the left sprint 17 applies the urging force is different from the point of application where the right spring 17 applies the urging force. Instead, however, the two springs 17 may comply with respective different standards so as to apply respective different urging forces. Alternatively, the two springs 17 may have respective different initial deformation amounts so as to apply respective different urging forces. Further, the two springs 17 may be replaced with other urging members such as another type of springs and rubbers. It is noted that, according to aspects of the present invention, since the same material may be used in common for the urging members (including the springs 17), it is possible to reduce the manufacturing cost of the image forming apparatus 1.

Further, instead of the endless belt 13 exemplified in the aforementioned embodiment, various kinds of endless belts may be employed such as a photoconductive belt and an intermediate transfer belt. FIG. 8 schematically shows an internal configuration of an image forming apparatus 100 that includes a photoconductive belt 173 and an intermediate transfer belt 183. As shown in FIG. 8, the photoconductive belt 173, which may be wound around three rollers 171, 172, and 174, may form a belt unit 170. In the same manner, the intermediate transfer belt 183, which may be wound around three rollers 181, 182, and 184, may form a belt unit 180. Moreover, the photoconductive belt 173 may contact the intermediate transfer belt 183.

Around the photoconductive belt 173, there may be a cleaning unit 191 for removing toner, a charger 122 configured in the same manner as the charger 22, a scanning unit 130, and development cartridges 124*c*, 124*m*, 124*y*, and 124*k* for the respective colors, which may be disposed sequentially in an order from a contact portion between the photoconductive belt 173 and the intermediate transfer belt 183 along a rotational direction of the photoconductive belt 173. In the same manner as the development cartridges 24, each development cartridge 124 may include a toner container 125 configured to accommodate toner of a corresponding one of the colors, i.e., black, cyan, magenta, and yellow, and a development roller 126.

Further, each of the development cartridges 124*c*, 124*m*, 124*y*, and 124*k* may be provided to reciprocate in such a direction (i.e., the front-to-rear direction) as to become closer to or farther away from the photoconductive belt 173. Specifically, each development cartridge 124 may be configured to move to a development position (e.g., the position of the development cartridge 124*c* shown in FIG. 8) close to the photoconductive belt 173 when a development process is performed for a corresponding color. Further, each development cartridge 124 may be configured to move to a rest position (e.g., the positions of the development cartridges 124*m*, 124*y*, and 124*k* shown in FIG. 8) separated from the photoconductive belt 173 when the development process is completed.

Therefore, the photoconductive belt 173 may be configured to, when toner is removed therefrom by the cleaning unit 191, have thereon an electrostatic latent image for a corresponding one of the four colors that is formed by the charger 122 and the scanning unit 130 and have thereon a toner image of the corresponding color formed by a corresponding one of the development cartridges 124*c*, 124*m*, 124*y*, and 124*k*. The toner image may be transferred to the contact portion on the intermediate transfer belt 183. When the same process is repeated four times for each color, the respective toner images of the four colors may sequentially be superimposed on the intermediate transfer belt 183 to form a color image.

Around the intermediate transfer belt 183, a transfer roller 193 and a cleaning unit 192 may be disposed sequentially in an order from the contact portion along a rotational direction of the intermediate transfer belt 183. A sheet P may be conveyed by various rollers (not shown) to a position between the transfer roller 193 and the intermediate transfer belt 183, where the color image may be transferred onto the sheet P. After that, the toner images may be thermally fixed on the sheet P by a fuser 140, which may include a heating roller 141 and a pressing roller 142 in the same manner as the fuser 40. Then, the sheet P with the toner images thermally fixed thereon may be ejected by various rollers (not shown) onto a catch tray (not shown) provided on an upper face of the image forming apparatus 100.

In the image forming apparatus 100, by adjusting the urging forces for at least one of the belt units 170 and 180 in the same manner as the aforementioned belt unit 10, it is possible to render the extension length of at least one of the photoconductive belt 173 and the intermediate transfer belt 183 even over an entire length thereof in the left-to-right direction. Accordingly, it is possible to prevent the at least one of the photoconductive belt 173 and the intermediate transfer belt 183 from getting close to one end thereof in the left-to-right direction or turning in a snaking manner. Thus, it is possible to extend the lifetime of the at least one of the photoconductive belt 173 and the intermediate transfer belt 183, prevent a guide provided for the at least one of the belt units 170 and 180 from being severely worn, and prevent the guide from going off a groove provided for the guide.

Moreover, in the belt unit 10, the reinforcing tape 19 may be attached between the guide 18 and the endless belt 13. Further, the intermediate transfer belt 183 may be configured to be driven to rotate in contact with the photoconductive drums 21 of the four process units 20 as shown in FIG. 1. Furthermore, aspects of the present invention may be applied to various types of image forming apparatuses such as inkjet printers configured to convey a recording medium on an endless belt as well as the above-exemplified laser printers.

What is claimed is:

1. An image forming apparatus configured to form an image of recording agent on a recording medium, the image forming apparatus comprising:
    a plurality of rollers having respective axes parallel to each other;
    an endless belt wound around the plurality of rollers, the endless belt being configured to be driven to turn and convey one of the recording medium and the recording agent;
    a strip-shaped guide provided to a first-side portion of the endless belt with respect to a middle point of a contact portion of a predetermined one of the plurality of rollers that turns in contact with the endless belt in an axial direction of the plurality of rollers, the guide being configured to continuously protrude from an inner circumferential surface of the endless belt;
    a groove formed on at least one of the plurality of rollers, the groove being configured to regulate movement of the endless belt in the axial direction in a state where the guide is fitted into the groove; and
    urging members provided at a first end and a second end of at least one of the plurality of rollers in the axial direction, the urging members being configured to urge the at least one roller in such a tensile direction as to apply a tension to the endless belt, the urging members comprising:
    a first urging member configured to apply, to the first end of the predetermined one roller, a first moment about the middle point of the contact portion of the predetermined one roller in the axial direction; and
    a second urging member configured to apply, to the second end of the predetermined one roller, a second moment about the middle point in the axial direction, the second moment and the first moment being adapted such that the first-side portion of the endless belt with respect to the middle point in the axial direction is extended in the tensile direction by a same length as a second-side portion of the endless belt with respect to the middle point in the axial direction under predetermined conditions of use for the image forming apparatus, based on a first load required for a unit extension rate in the tensile direction of the first-side portion and a second load required for a unit extension rate in the tensile direction of the second-side portion, the first load determined based on a cross-sectional area and a Young's modulus of each element included in the first-side portion, the second load determined based on a cross-sectional area and a Young's modulus of each element included in the second-side portion.

2. The image forming apparatus according to claim 1, wherein the conditions of use include a condition of use at an upper limit of a predetermined range of usage environment temperatures for the image forming apparatus.

3. The image forming apparatus according to claim 1, wherein the conditions of use include a condition that causes creep deformation of the endless belt at an upper limit of a predetermined range of usage environment temperatures for the image forming apparatus.

4. The image forming apparatus according to claim 1,
wherein the image forming unit comprises a reinforcing tape attached onto an outer circumferential surface of the first-side portion of the endless belt, and
wherein a Young's modulus of the reinforcing tape under the conditions of use is larger than a Young's modulus of the endless belt under the conditions of use, such that the first-side portion of the endless belt where the guide and the reinforcing tape are provided is extended in the tensile direction by a same length as the second-side portion of the endless belt under the predetermined conditions of use.

5. The image forming apparatus according to claim 1,
wherein the first and second urging members are configured to provide a same level of urging forces, and
wherein a distance between a point of application of an urging force applied to the predetermined one roller by the first urging member and the middle point of the contact portion of the predetermined one roller in the axial direction is different from a distance between a point of application of an urging force applied to the predetermined one roller by the second urging member and the middle point in the axial direction.

6. An image forming apparatus configured to form an image of recording agent on a recording medium, the image forming apparatus comprising:
a plurality of rollers having respective axes parallel to each other;
an endless belt wound around the plurality of rollers, the endless belt being configured to be driven to turn and convey one of the recording medium and the recording agent;
a strip-shaped guide provided to a first-side portion of the endless belt with respect to a middle point of a contact portion of a predetermined one of the plurality of rollers that turns in contact with the endless belt in an axial direction of the plurality of rollers, the guide being configured to continuously protrude from an inner circumferential surface of the endless belt;
a groove formed on at least one of the plurality of rollers, the groove being configured to regulate movement of the endless belt in the axial direction in a state where the guide is fitted into the groove; and
urging members provided at a first end and a second end of at least one of the plurality of rollers in the axial direction, the urging members being configured to urge the at least one roller in such a tensile direction as to apply a tension to the endless belt, the urging members comprising:
a first urging member configured to apply, to the first end of the predetermined one roller, a first moment about the middle point of the contact portion of the predetermined one roller in the axial direction; and
a second urging member configured to apply, to the second end of the predetermined one roller, a second moment about the middle point in the axial direction, the second moment being adapted to be different from the first moment such that the first-side portion of the endless belt with respect to the middle point in the axial direction is extended in the tensile direction by a same length as a second-side portion of the endless belt with respect to the middle point in the axial direction under predetermined conditions of use for the image forming apparatus,
wherein the image forming unit comprises a reinforcing tape attached onto an outer circumferential surface of the first-side portion of the endless belt, and
wherein a Young's modulus of the reinforcing tape under the conditions of use is larger than a Young's modulus of the endless belt under the conditions of use, such that the first-side portion of the endless belt where the guide and the reinforcing tape are provided is extended in the tensile direction by a same length as the second-side portion of the endless belt under the predetermined conditions of use.

7. The image forming apparatus according to claim 6, wherein the conditions of use include a condition of use at an upper limit of a predetermined range of usage environment temperatures for the image forming apparatus.

8. The image forming apparatus according to claim 6, wherein the conditions of use include a condition that causes creep deformation of the endless belt at an upper limit of a predetermined range of usage environment temperatures for the image forming apparatus.

9. The image forming apparatus according to claim 6,
wherein the first and second urging members are configured to provide a same level of urging forces, and
wherein a distance between a point of application of an urging force applied to the predetermined one roller by the first urging member and the middle point of the contact portion of the predetermined one roller in the axial direction is different from a distance between a point of application of an urging force applied to the predetermined one roller by the second urging member and the middle point in the axial direction.

* * * * *